United States Patent [19]

Reits

[11] Patent Number: 4,912,472

[45] Date of Patent: Mar. 27, 1990

[54] FM-CW RADAR APPARATUS

[75] Inventor: Bernard J. Reits, Hengelo, Netherlands

[73] Assignee: Hollandse Signaalapparaten B.V., Hengelo, Netherlands

[21] Appl. No.: 252,244

[22] Filed: Sep. 30, 1988

[30] Foreign Application Priority Data

Oct. 1, 1987 [NL] Netherlands ............... 8702342

[51] Int. Cl.$^4$ ............................................. G01S 13/28
[52] U.S. Cl. ................................... 342/128; 342/122
[58] Field of Search ............... 342/122, 128, 120, 196, 342/118

[56] References Cited

U.S. PATENT DOCUMENTS

| | | | |
|---|---|---|---|
| 3,918,054 | 11/1975 | Collins | 342/192 |
| 4,042,925 | 8/1977 | Albanese et al. | 342/132 |
| 4,268,828 | 5/1981 | Gibbs et al. | 342/26 |
| 4,271,412 | 6/1981 | Glass et al. | 342/98 |
| 4,389,649 | 6/1983 | Parkhurst et al. | 342/189 |
| 4,429,309 | 1/1984 | Kipp | 342/103 |
| 4,521,778 | 6/1985 | Knepper | 342/134 |
| 4,568,938 | 2/1986 | Ubriaco | 342/87 |
| 4,618,863 | 10/1986 | Collins | 342/194 |
| 4,620,192 | 10/1986 | Collins | 342/128 |
| 4,666,295 | 5/1987 | Duvall, III et al. | 342/201 X |

Primary Examiner—Stephen C. Buczinski
Assistant Examiner—John B. Sotomayor
Attorney, Agent, or Firm—Robert J. Kraus

[57] ABSTRACT

The invention relates to an FM-CW radar apparatus where the frequency sweep duration (R) corresponding with the transmitted signal is increased to obtain a mixing signal which is operational in a wider frequency range than the frequency sweep of the transmitted signal. This has the effect that processing of echo signals of sufficient length can be realized, also from objects which are located near the limits of the radar range.

7 Claims, 4 Drawing Sheets

FM-CW RADAR APPARATUS

The invention relates to an FM-CW radar apparatus provided with a transmitter for generating transmitter signals at a particular frequency sweep rate ($\Delta f/\Delta t$) across a (first) frequency interval ($f_0$, $f_0+\Delta f$), and with a receiver comprising a mixer using mixing signals for demodulation of echo signals obtained from the transmitted signals, and comprising a DFT unit, which is provided with terminals suitable for the reception of digitised and sampled signals and which unit is designed to provide target distance data related to the heterodyne frequency and referring to the signals supplied.

Such a radar apparatus is known from the patent U.S. No. 4,568,938. The radar apparatus disclosed in this patent is an altimeter, particularly for measurement of the distance to objects in its vicinity. However, the radar apparatus is not suitable for measuring the distance to an object close to the limits of the range of this radar apparatus, since the signal duration of the modulated echo signal of the object decreases within the corresponding pulse repetition time when the object is further away.

The present invention is based on the idea of increasing the frequency sweep duration of the mixing signal which is operational in a wider frequency range, without increasing the frequency sweep duration of the transmitter signal. Thus the objective is achieved, i.e. processing echo signals of sufficient length from objects which are located near the limits of the radar range.

According to the invention, a radar apparatus of the type described in the opening paragraph has a transmitter suitable for generating the said mixing signals at the said frequency sweep rate ($\Delta f/\Delta t$) across a second frequency interval ($f_1$, $f_1+k\cdot\Delta f$) with $k>1$, which is longer than the first frequency interval.

The invention will now be described in more detail with reference to the accompanying figures, of which:

Figure 1:
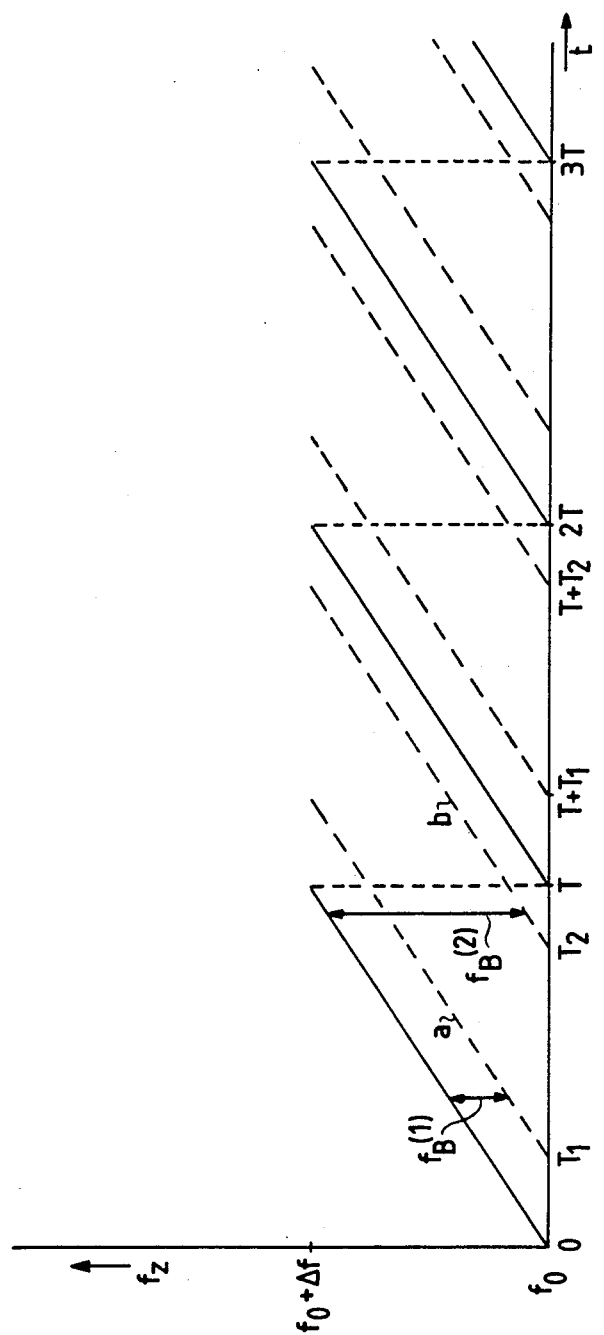
FIG. 1 shows a timing diagram of the signals occurring in an FM-CW radar apparatus.

The diagram of FIG. 1 shows the variation with time of transmitting frequency $f_z$ of an FM-CW radar apparatus. The transmitter repetitively covers a frequency interval ($f_0$, $f_0+\Delta f$) with a frequency $f_r=T^{-1}$ at a constant frequency sweep rate ($df/dt$). The diagram shows that, for a target located in the radar's proximity (target distance $R_1=\frac{1}{2}cT_1$), echo signal "a" is received during a considerable part of the listening time T. When echo signal "a" is demodulated with a mixing signal, which can be considered as a replica of the current transmitter signal, the heterodyne signal, also called beat signal, is obtained, having a frequency $f_B^{(1)}$. This beat signal is long enough to provide sufficient information on the target distance. This is not so for an echo signal "b" generated by an object at a target distance $R_2=\frac{1}{2}cT_2$ near the time limits of the radar range. Echo signal "b" shows that it is only during a short period ($T_2$, T) within the listening time (0, T) mixed with the then present mixing signal to obtain the beat signal having a frequency $f_B^{(2)}$. Only if generation of the mixing signal to higher frequencies $f_m$ with $f_m>f_0+\Delta f$, at the same frequency sweep rate, would be continued would it be possible to receive longer echo signals from objects at greater distances, and thus to obtain a beat signal of sufficient length. Since for the generation of the transmitter signal the transmitter can only operate in the range ($f_0$, $f_0+\Delta f$), it is impossible to actually derive such a mixing signal from the transmitted signal. By increasing the frequency sweep length for the generation of the mixing signal required for demodulation of the echo signal, but not for the generation of the transmitter signal, while maintaining the frequency sweep rate belonging to the transmitter signal, a beat signal of sufficient length can be obtained within the listening time from an echo signal from a far away target. The total period of time during which generation of the mixing signal should take place is preferably 2T, but may be longer or shorter if required.

In the following descriptions of the drawings, a time of 2T is assumed for the generation of a mixing signal. Although the actual generation of the transmitter signals takes up a period of time T, the reception of the echo signals and thus the processing of these echo signals by a DFT unit takes up a period of time 2T, and will take place in time interval (0, 2T).

Figure 2:
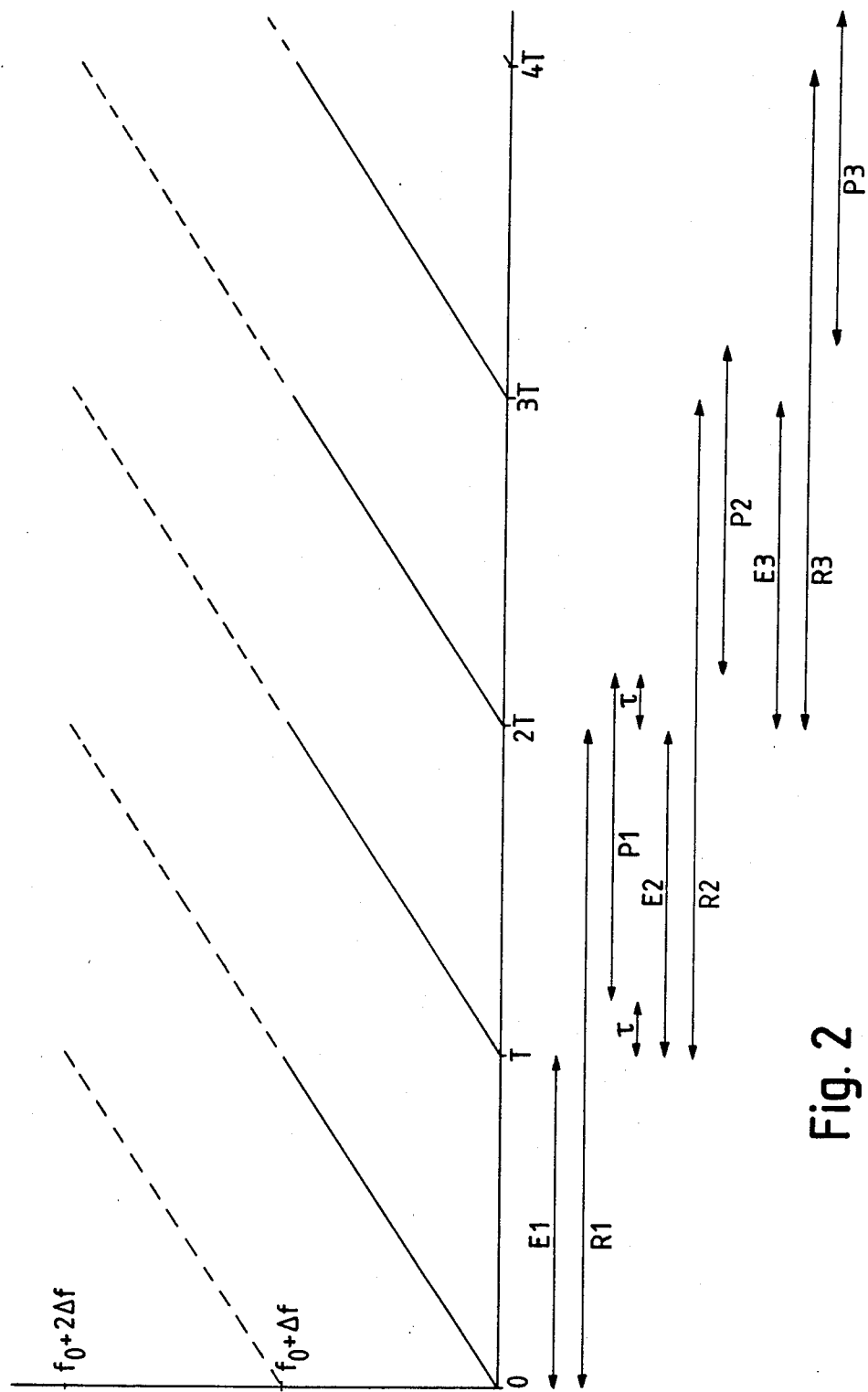
FIG. 2 shows a timing diagram of the transmitter signals occurring in an FM-CW radar apparatus, with accompanying time sequences for the various related processing times.

According to an advantageous embodiment of the invention, an additional measure, i.e. introduction of dispersive delay means, may be applied, where after generation of the transmitter signals within the time interval (0, T) indicated with $E_1$, the echo signals received within the time interval (0, 2T) indicated with $R_1$ after demodulation undergo a frequency dependent delay to such an extent that all resulting signals are concentrated within a time interval $(T+\tau, 2T+\tau)$ indicated with $P_1$ and thus within a period of time T, as indicated in FIG. 2. The result will be that a DFT processing period T is added to transmitting time T, where the position of time interval $P_1$ with respect to time interval $R_1$ is entirely dependent on the type of dispersive delay means applied. This in fact amounts to the realisation of a type of "pulse compression" in a CW radar, which in pulse-doppler radars entails known advantages. With this type of "pulse compression" the signal-to-noise ratio is improved. This compression can be further increased by generating the mixing signal during a time interval $k\cdot T$ ($k>2$ and $K\epsilon N$), while while the dispersive delay means again concentrate the received signal within a time length T.

Generally according to the invention the mixing signal is generated during $k\cdot T$ ($k>1$ and $k\epsilon N$) seconds, so that time interval $R_1$ is longer than time intervall $E_1$. Additionally, the introduction of dispersive delay means can achieve a type of pulse compression by concentrating the received signal within time interval $P_1$, where time interval $P_1$ is shorter than time interval $R_1$. According to the special embodiment as described above, however, time interval $P_1$ has the same length as time interval $E_1$, which should not be considered a restriction of the invention.

Figure 3:
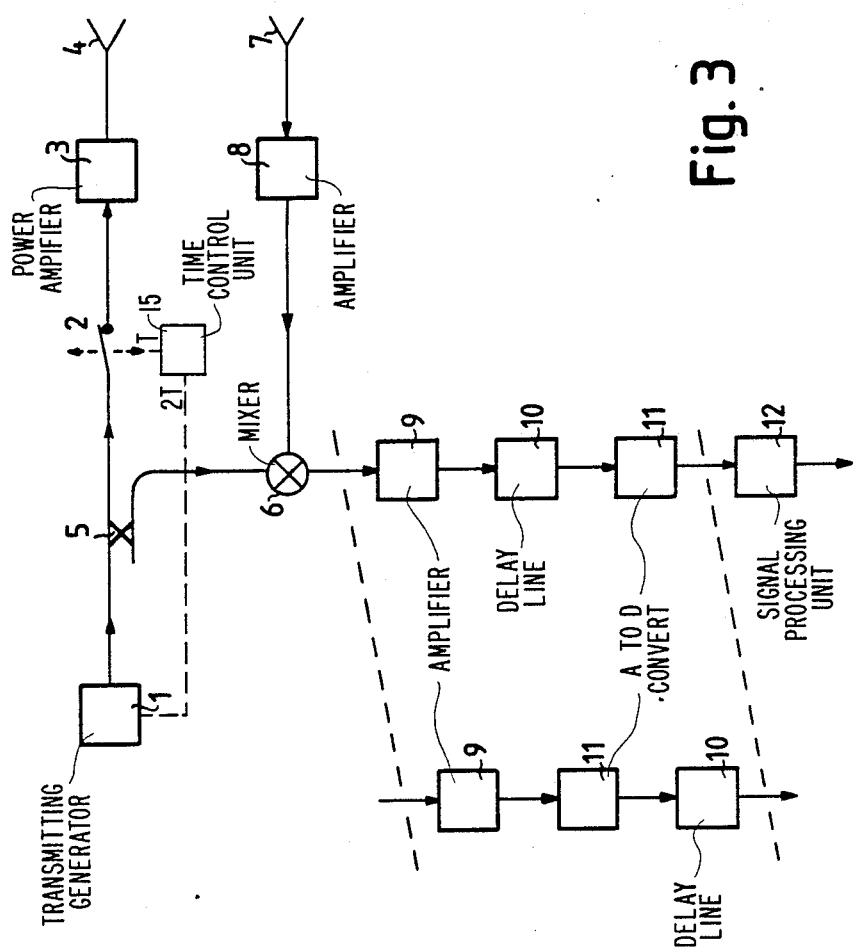
FIG. 3 is a block diagram of a first embodiment of an FM-CW radar apparatus.

FIG. 3 illustrates an embodiment of an FM-CW radar apparatus according to the invention. This block diagram shows a transmitting generator 1, which is suitable for the generation of signals within a frequency range ($f_0$, $f_0+2\Delta f$) at a fixed frequency sweep rate $df/dt$, in such a way that during subsequent frequency sweep periods of a duration T, the frequency range is covered from $f_0$ to $f_0+\Delta f$. Via a closed switch 2 these signals are supplied to a power amplifier 3 to obtain transmitter signals, which are transmitted via transmitting antenna 4. The signals produced by transmitter generator 1 are also supplied to a mixer 6 via a decoupler (or duplexer) 5. Furthermore, the echo signals obtained via receiving antenna 7 are, after amplification in amplifier 8 of the LNTA type, also supplied to mixer 6. To achieve the required operation, where transmitter signals are only transmitted during time period T within a frequency range ($f_0$, $f_0+\Delta f$), but where the mixing signals are generated during a time period 2T within a frequency range ($f_0$, $f_0+2\Delta f$), transmitter generator 1 is suitable to maintain the frequency sweep in the subsequent time period T at the same frequency sweep rate df/dt across the next frequency interval ($f_0+\Delta f$, $f_0+2\Delta f$), and switch 2 is opened after time period T. The beat signals obtained by demodulation of the echo signals with the transmitting signals, are amplified in m.f. amplifier 9 and filtered there as a result of the permitted band width. The output signals of amplifier m.f. 9 are subsequently supplied to a dispersive delay line 10, in which the frequency signals having the lowest beat frequency are delayed by a time period T with respect to those having the highest beat frequency. The output signals of the dispersive delay line 10, which as a result have shifted and been concentrated within the same interval T, are sampled and digitised in an analogue digital converter 11 and subsequently supplied to a DFT signal processing unit 12. Because to each frequency value of the target echo signal a target distance can be allocated and this is also true for the frequency value of the beat signal, each frequency channel of the DFT signal processing unit will represent a particular distance interval, to which the measured target belongs. It is furthermore possible to exchange the sequence of delay line 10 and analogue-digital converter 11, as illustrated in the inset of FIG. 3.

Figure 4:
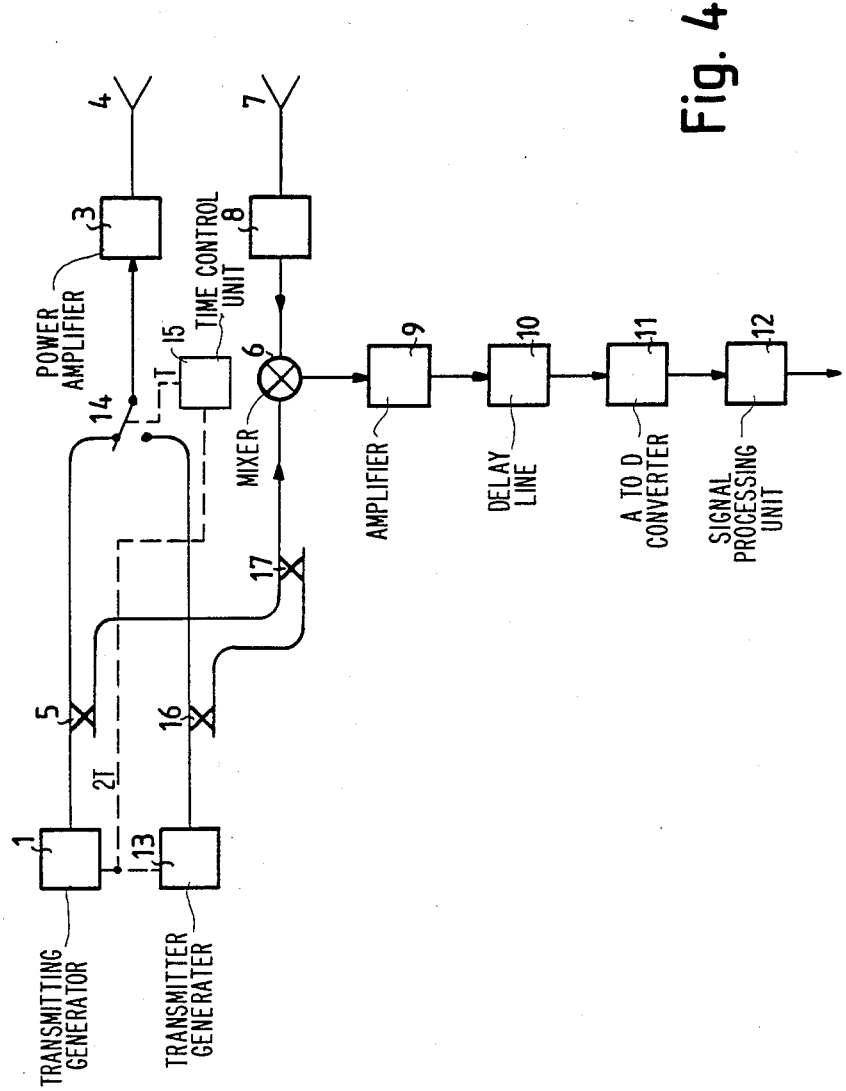
FIG. 4 is a block diagram of another embodiment of an FM-CW radar apparatus.

Because generator 1 is engaged in the generation of the mixing signal for the mixer during the entire period 2T, it is not possible to maintain the pulse repetition frequency at the value $f_r=T^{-1}$ in the embodiment shown in FIG. 1. However, this will be possible in the embodiment of an FM-CW radar apparatus as illustrated in FIG. 4, which, as opposed to the radar apparatus represented in FIG. 3, comprises besides the first transmitter generator 1, a second transmitter generator 13 of the same type, as well as a bipolar switching unit 14 instead of switch 2 for alternatively connecting transmitter generators 1 and 13 to power amplifier 3, which is to take place using a time control unit 15. By means of this time control unit, transmitter generators 1 and 13 are, alternately and in a rhythm determined by the repetition frequency $f=T^{-1}$, continuously reset to the lowest value $f_0$ of the corresponding frequency range, while switch 14 is switched by time control unit 15 in such a way that a transmitter signal having a frequency varying within frequency range ($f_0$, $f_0+\Delta f$) is repetitiously ($f=T^{-1}$) supplied to power amplifier 3. Decoupling of a small amount of signal energy from the output lines of transmitter generators 1 and 13 by means of duplexers 5 and 16 respectively and subsequent concentration of this signal energy by means of a duplexer 17, provides mixer 6 with the required mixing signals for demodulation of the received echo signals.

I claim:
1. FM-CW radar apparatus comprising:
transmitter means for generating transmitter signals at a frequency sweep rate ($\Delta f/\Delta t$) across a frequency interval ($f_0$, $f_0+\Delta f$);
receiver means including mixer means using mixing signals for demodulation of echo signals obtained from the transmitted signals;
DFT means including terminals suitable for the reception of digitised and sampled signals and which DFT means provides target distance data; and
means for generating said mixing signals at said frequency sweep rate ($\Delta f/\Delta t$) across a second frequency interval ($f_1$, $f_1=k\cdot\Delta f$), which is longer than the first frequency interval ($k>1$).

2. FM-CW radar apparatus as claimed in claim 1 comprising dispersive delay means connected between the mixer and the DFT means for delaying the demodulated echo signals in dependency of the signal frequency.

3. FM-CW radar apparatus as claimed in claim 1, wherein the second frequency interval ($f_1$, $f_1+k\cdot\Delta f$) is twice as long as the first frequency interval ($k=2$).

4. FM-CW radar apparatus as claimed in claim 1, wherein the lowest frequency values occuring in both frequency intervals are identical.

5. FM-CW apparatus as claimed in claim 1, comprising sampling and digitisation means connected between the mixer and the delay means.

6. FM-CW radar apparatus as claimed in claim 4, comprising sampling and digitisation means connected between the delay means and the DFT unit.

7. FM-CW radar apparatus as claimed in any of claims 1-6, comprising a first and a second transmitter generator, both generators being suitable for the execution of a frequency sweep across the second frequency interval; and switching means:
for alternately interconnecting one of the transmitter generators with the antenna means and for simultaneously resetting to the initial position the transmitter generator then interconnected with the antenna means; and
combiner means connected to both transmitter generators, for obtaining the mixing signals.

* * * * *